(12) United States Patent
Dupper

(10) Patent No.: US 11,794,564 B2
(45) Date of Patent: Oct. 24, 2023

(54) BODY STRUCTURE FOR AN ELECTRICALLY OPERATED VEHICLE

(71) Applicant: VOLKSWAGEN AKTIENGESELLSCHAFT, Wolfsburg (DE)

(72) Inventor: Denis Dupper, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 278 days.

(21) Appl. No.: 17/311,414

(22) PCT Filed: Nov. 11, 2019

(86) PCT No.: PCT/EP2019/080786
§ 371 (c)(1),
(2) Date: Jun. 7, 2021

(87) PCT Pub. No.: WO2020/114713
PCT Pub. Date: Jun. 11, 2020

(65) Prior Publication Data
US 2022/0024292 A1 Jan. 27, 2022

(30) Foreign Application Priority Data
Dec. 5, 2018 (DE) .......................... 102018221049.7

(51) Int. Cl.
*B60K 1/04* (2019.01)
*B60L 50/60* (2019.01)
(Continued)

(52) U.S. Cl.
CPC ............... *B60K 1/04* (2013.01); *B60L 50/60* (2019.02); *B62D 25/025* (2013.01); *B62D 25/2036* (2013.01); *B60K 2001/0438* (2013.01)

(58) Field of Classification Search
CPC ... B60K 1/04; B60K 2001/0438; B60L 50/60; B62D 25/025; B62D 25/2036
See application file for complete search history.

(56) References Cited

U.S. PATENT DOCUMENTS 2,959,446 A * 11/1960 Thompson ......... B60N 2/42727
296/68.1
3,950,011 A * 4/1976 Yamanaka ............. B62D 53/06
280/441

(Continued)

FOREIGN PATENT DOCUMENTS

DE 102007058250 A1 6/2008
DE 102011116684 A1 4/2012
(Continued)

*Primary Examiner* — Jason D Shanske
*Assistant Examiner* — James J Triggs
(74) *Attorney, Agent, or Firm* — Laurence A. Greenberg; Werner H. Stemer; Ralph E. Locher

(57) ABSTRACT

A body structure for an electrically operated vehicle has an installation space for a traction battery which is downwardly open in the vehicle vertical direction and upwardly delimited by a floor sheet-metal part forming the vehicle floor. The traction battery is inserted into the installation space from below the vehicle. A free installation gap is formed between a battery ceiling wall and the floor sheet-metal part and a spacer is supported between the battery ceiling wall and the floor sheet-metal part. The spacer is formed in two parts, namely, a buffer made from an elastic, flexible, soft component and a base made of a component-stiff hard component. In an undeformed production state, the installation height of the spacer is greater than the gap size of the installation gap. In an installation position, the spacer is supported between the floor sheet-metal part and the battery ceiling wall, elastically deforming the buffer.

14 Claims, 4 Drawing Sheets

(51) Int. Cl.
*B62D 25/02* (2006.01)
*B62D 25/20* (2006.01)

(56) References Cited

U.S. PATENT DOCUMENTS

| | | | | | |
|---|---|---|---|---|---|
| 3,981,530 | A | * | 9/1976 | Yamanaka | B60P 7/16 180/274 |
| 4,174,014 | A | * | 11/1979 | Bjorksten | H01M 50/293 180/68.5 |
| 4,365,681 | A | * | 12/1982 | Singh | B60L 50/64 180/68.5 |
| 4,449,603 | A | * | 5/1984 | Langwieder | B60K 5/1208 248/548 |
| 4,754,827 | A | * | 7/1988 | Hirabayashi | B60R 16/04 180/68.5 |
| 8,733,487 | B2 | * | 5/2014 | Usami | B62D 21/11 180/68.5 |
| 11,465,692 | B2 | * | 10/2022 | Schlesinger | B62D 27/04 |
| 2008/0136110 | A1 | * | 6/2008 | He | B60K 1/04 277/316 |
| 2012/0040219 | A1 | * | 2/2012 | Cappellotti | B60L 50/66 429/99 |
| 2014/0328582 | A1 | * | 11/2014 | Park | B29D 11/00865 396/85 |

FOREIGN PATENT DOCUMENTS

| | | |
|---|---|---|
| DE | 102014226566 B3 | 4/2016 |
| DE | 102016206177 A1 | 10/2017 |
| DE | 102016221913 A1 | 5/2018 |
| DE | 102017205447 A1 | 10/2018 |
| WO | 2019211078 A1 | 11/2019 |

* cited by examiner

BODY STRUCTURE FOR AN ELECTRICALLY OPERATED VEHICLE

BACKGROUND OF THE INVENTION

Field of the Invention

The invention relates to a body structure for an electrically operated vehicle having an installation space for a traction battery. The installation space is open in the vehicle vertical direction towards the bottom of the vehicle and is upwardly delimited a floor sheet-metal part which forms the vehicle floor. The traction battery is inserted into the installation space from underneath the vehicle, namely with the formation of a free installation gap between a battery top wall and the floor sheet-metal part. At least one spacer is supported between the battery top wall and the floor sheet-metal part.

In an electrically operated, two-track vehicle, a traction battery can be installed on the vehicle floor from beneath the vehicle. There is known from DE 10 2017 205 447 A1 a body structure according to the preamble which has an installation space for the traction battery, which installation space is open in the vehicle vertical direction in the direction of the bottom of the vehicle. The installation space is delimited in the direction of the top of the vehicle by a floor sheet-metal part which forms the vehicle floor. The traction battery can be inserted into the installation space from beneath the vehicle, namely with the formation of a free installation gap between a battery top wall and the floor sheet-metal part. In the assembled state, at least one spacer is supported between the battery top wall and the floor sheet-metal part. A vertical load path from the floor sheet-metal part via the spacer and the battery top wall into a stiffening structure inside the battery is thereby provided.

In DE 10 2017 205 447 A1, the battery top wall has stiffening beads. The stiffening beads are each configured with a bead base which is set back by a bead height from a top wall base portion towards the battery interior. The bead base is in force-transmitting contact with the stiffening structure inside the battery. In addition, the spacer is in the form of a hollow cylindrical sleeve with a sleeve base lying on the bead base. The sleeve base of the spacer is clamped to the stiffening structure inside the battery by means of a fastening screw with the interposition of the bead base. In DE 10 2017205 447 A1, the spacer fills the channel-like bead cross section almost completely. As a result, water which has collected in the stiffening bead or dirt which has collected therein cannot readily be discharged from the stiffening bead to outside the vehicle in a discharge direction. In addition, in DE 10 2017 205 447 A1, the sleeve-like spacer is designed as a completely rigid component. As a result, tolerance-related deviations in the size of the installation gap between the traction battery and the vehicle floor can be compensated only inadequately.

SUMMARY OF THE INVENTION

The object of the invention consists in providing a body structure for an electrically operated vehicle, in which force transmission from the vehicle floor into the stiffening structure of the traction battery can take place simply and reliably.

The object is achieved by the features as claimed. Preferred further developments of the invention are disclosed in the dependent claims.

As claimed, the spacer is no longer designed as a completely rigid component but instead is constructed in two parts of a buffer and of a base. The buffer is produced from an elastically resilient soft component, while the spacer base is formed of a hard component. The spacer can preferably be produced from plastics material in a two-component injection molding process. The spacer is structurally so designed that, in an undeformed production state, the overall height of the spacer is greater than the size of the installation gap between the traction battery and the vehicle floor. In this case, the spacer, in an installed position, is supported between the floor sheet-metal part and the battery top wall with elastic deformation of the buffer. Owing to the elastic deformation of the buffer, tolerance-related deviations in the size of the installation gap can readily be compensated.

The spacer can on the one hand be fixedly attached to the battery top wall and on the other hand be supported in loose contact against the underside of the floor sheet-metal part. It is preferred if the attachment is in the form of a structurally simple adhesive bond, in which a base adhesive surface of the spacer is adhesively bonded to the battery top wall via an adhesive layer.

In a technical implementation, at least one stiffening bead can be formed in the battery top wall. The stiffening bead can be impressed into the top wall base portion, which is in itself planar, from the top of the vehicle. In this case, the stiffening bead can have a bead base which is set back by a bead height from the top wall base portion towards the battery interior. The bead base can be in force-transmitting contact with a stiffening structure inside the battery. The battery top wall can preferably be screwed to the stiffening structure inside the battery, namely at a screw position at which a fastening screw clamps the bead base of the stiffening bead to the stiffening structure inside the battery. The screw head of the fastening screw is preferably positioned, in a manner that is advantageous in terms of installation space, inside the stiffening bead, namely without protruding in the vehicle vertical direction beyond the planar top wall base portion. The stiffening structure inside the battery is preferably battery cross-member extending in the vehicle transverse direction, which, at least in the event of a side crash, is able to transmit impact forces on either side to the side of vehicle that is remote from the crash.

In order to provide a vertical load path from the floor sheet-metal part via the spacer and the battery top wall into the stiffening structure inside the battery, it is preferred if the spacer base has a supporting contour via which the spacer is supported directly on the bead base.

The above-mentioned spacer supporting contour is preferably functionally and spatially separate from the base adhesive surface. Against this background, the spacer supporting contour can be supported in loose contact on the bead base. By contrast, the base adhesive surface can be adhesively bonded to the top wall base portion in an offset position with respect to the base supporting contour, that is to say can be adhesively bonded outside the stiffening bead.

The at least one stiffening bead can extend in the vehicle transverse direction as far as an outer lateral edge of the battery top wall and can be open to outside the vehicle in the vehicle transverse direction. In this manner, water or dirt which collects in the stiffening bead can be discharged to outside the vehicle in a discharge direction along the stiffening bead. It has been shown that a large amount of dust and/or liquid enters from outside the vehicle in driving operation. The evacuation of water/dirt is facilitated by the provision of the stiffening bead.

In order not to block the evacuation of water/dirt within the stiffening bead, the base supporting contour of the spacer can preferably not fill the entire bead cross section but instead be supported on the bead base with the formation of a passage which is open in the discharge direction. In a technical implementation, the base supporting contour can have two supporting ribs which are supported on the bead base and between which the open passage is formed. Alternatively, it is also possible to provide only one supporting rib, which is supported on the bead base with open spaces on both sides to the bead walls of the stiffening bead.

The stiffening bead can be configured so as to be channel-shaped in the profile cross section with two bead walls raised from the bead base. The bead walls can merge at transition edges into the planar top wall base portion. It is preferred in the case of such a bead geometry if the base supporting contour merges into the base adhesive surface transversely to the bead longitudinal direction and with the interposition of a positioning contour on both sides. The respective positioning contour can be in the form of a positioning flank which is in positive contact with the respective bead wall.

In contrast to the prior art, the adhesive connection of the spacer to the battery top wall is functionally and/or spatially independent of the screw connection of the battery top wall to the stiffening structure inside the battery. In this manner, the positioning of the spacers can be carried out independently of the positioning of the screw positions, so that degrees of freedom in the assembly of the body structure are obtained.

An exemplary embodiment of the invention will be described hereinbelow with reference to the accompanying figures.

DETAILED DESCRIPTION OF THE INVENTION

Figure 1:
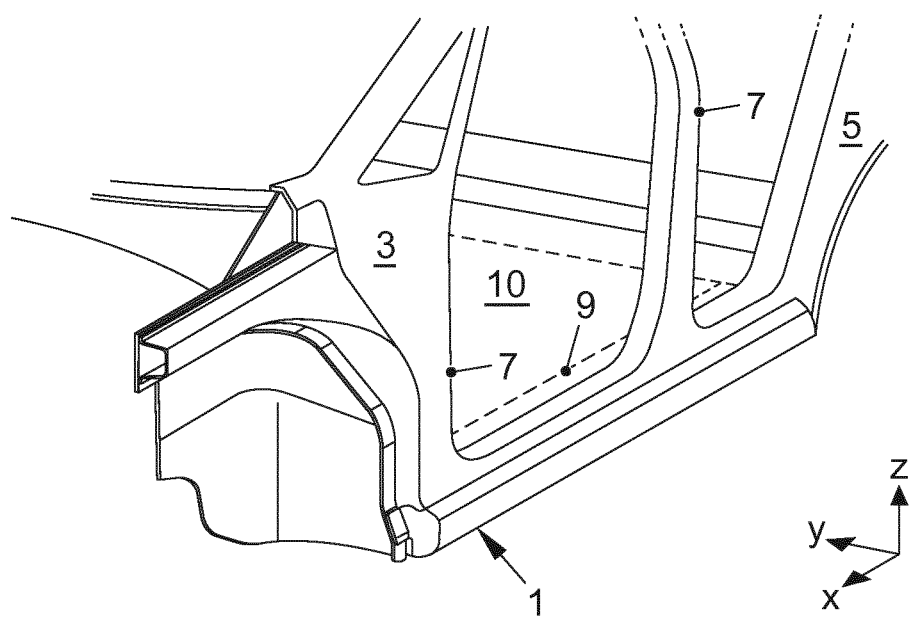
FIG. 1 shows, in a perspective partial view, a body structure of a motor vehicle.

In FIG. 1 there is shown a body structure of a two-track vehicle, which will be described hereinbelow inasmuch as it is required for the understanding of the invention. Accordingly, the body structure has two lateral sills 1 running in the vehicle longitudinal direction x, only one of which is shown in FIG. 1. The sill 1 extends in the vehicle longitudinal direction x between a front A-pillar 3 and a rear C-pillar 5 and delimits side door openings 7 at the bottom. A crash-sensitive traction battery 9 is installed in the vehicle floor of the body structure. The traction battery is positioned beneath a floor sheet-metal part 10 and extends in the vehicle transverse direction y between the two sills 1. In the vehicle longitudinal direction x, the traction battery 9 extends between a front cross-member and a rear cross-member, which are not shown in the figures.

Figure 2:
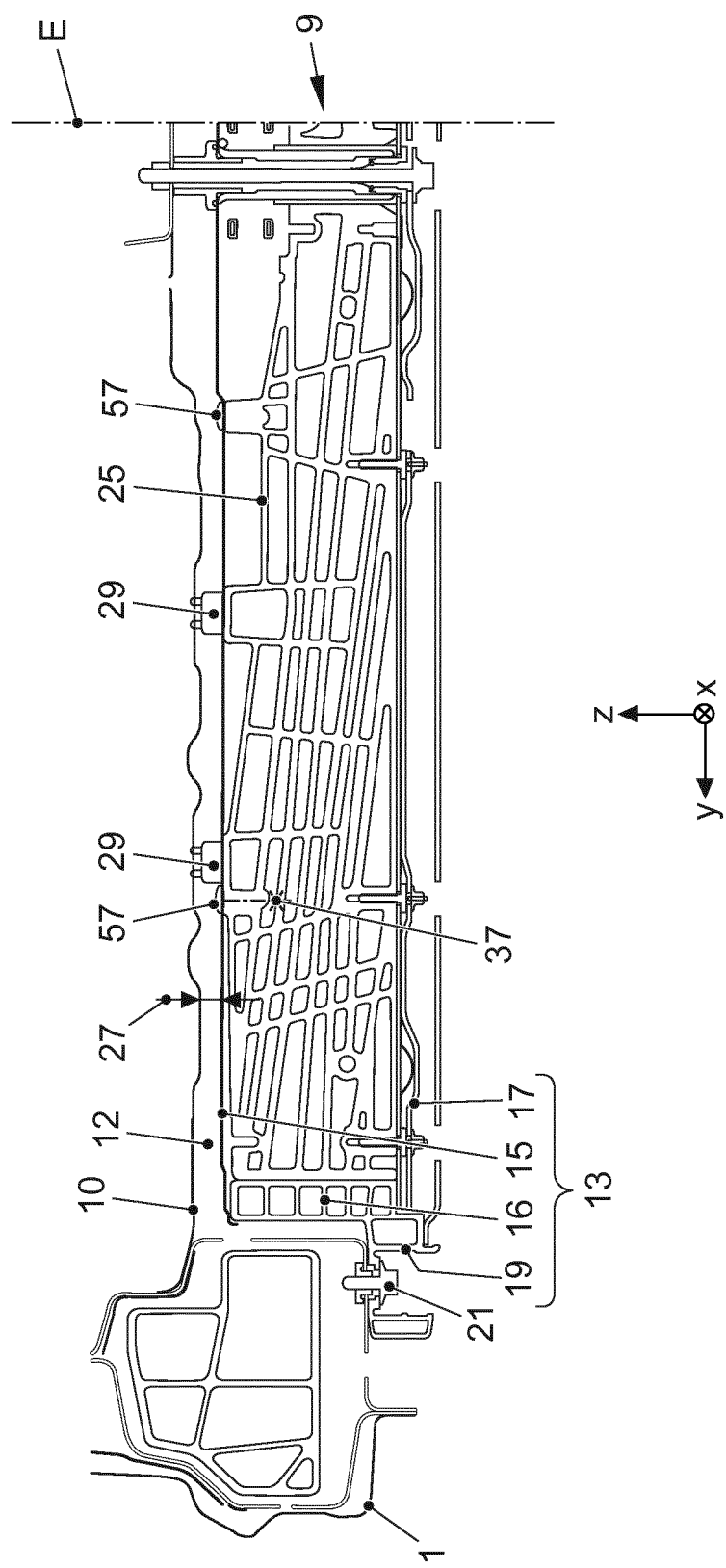
FIG. 2 shows, in a lateral sectional view, the assembled position of the traction battery in the body structure.

As is apparent from FIG. 1, the traction battery 9, when viewed in the vehicle vertical direction z, is positioned at approximately the same height as the sills 1. In FIG. 2, the traction battery 9 has a battery housing 13, namely with a housing side wall 16, a top wall 15 and a bottom wall 17. The housing side wall 16 is configured with a laterally protruding housing flange 19, which engages beneath the sill 1 and is in a screw connection 21 therewith. Inside the traction battery 9 there are positioned battery cells 23 and a stiffening structure inside the battery, which has inter alia a battery cross-member 25 shown in FIG. 2 which extends in the vehicle transverse direction y between the two housing side walls 16. In FIG. 2, only half the body structure up to the vehicle mid-plane E is shown. The other half which is not shown is approximately the mirror image thereof. In the event of a side crash, the impact forces are transmitted from the sill 1 that faces the crash in a transverse load path, which includes the battery cross-member 25, in the direction towards the sill 1 that is remote from the crash.

In an assembly operation, the traction battery 9 is first inserted in an assembly direction from beneath the vehicle into an installation space 12 which is defined by the two front and rear body cross-members and the lateral sills 1 and the floor sheet-metal part 10. The housing flange 19 of the traction battery 9 is then screwed to the front and rear body cross-members and to the sills 1, namely with the formation of a free installation gap 27 between the battery top wall 15 and the floor sheet-metal part 10.

Figure 3:
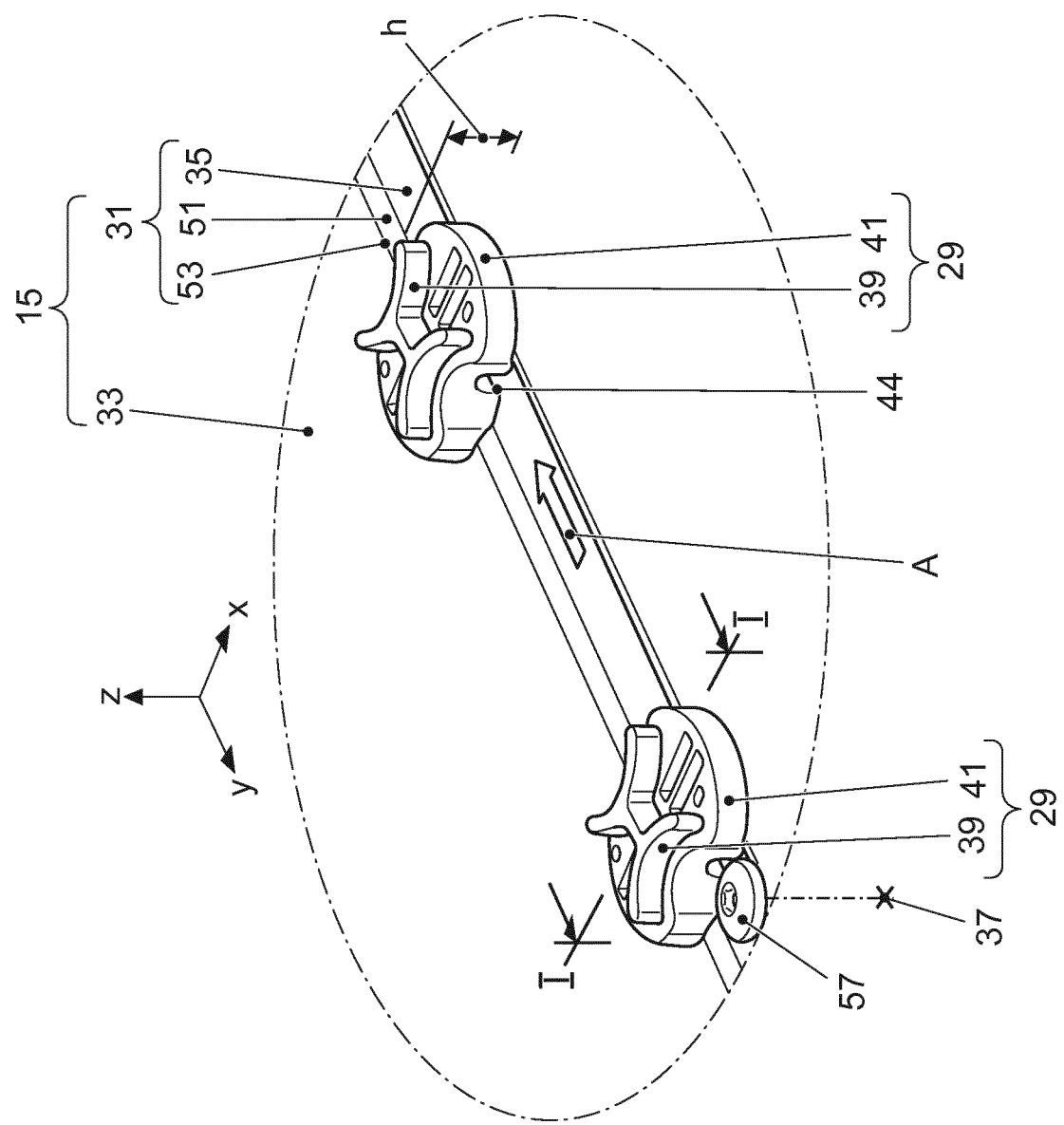
FIGS. 3 and 4 each show different views of spacers according to the invention.
Figure 4:
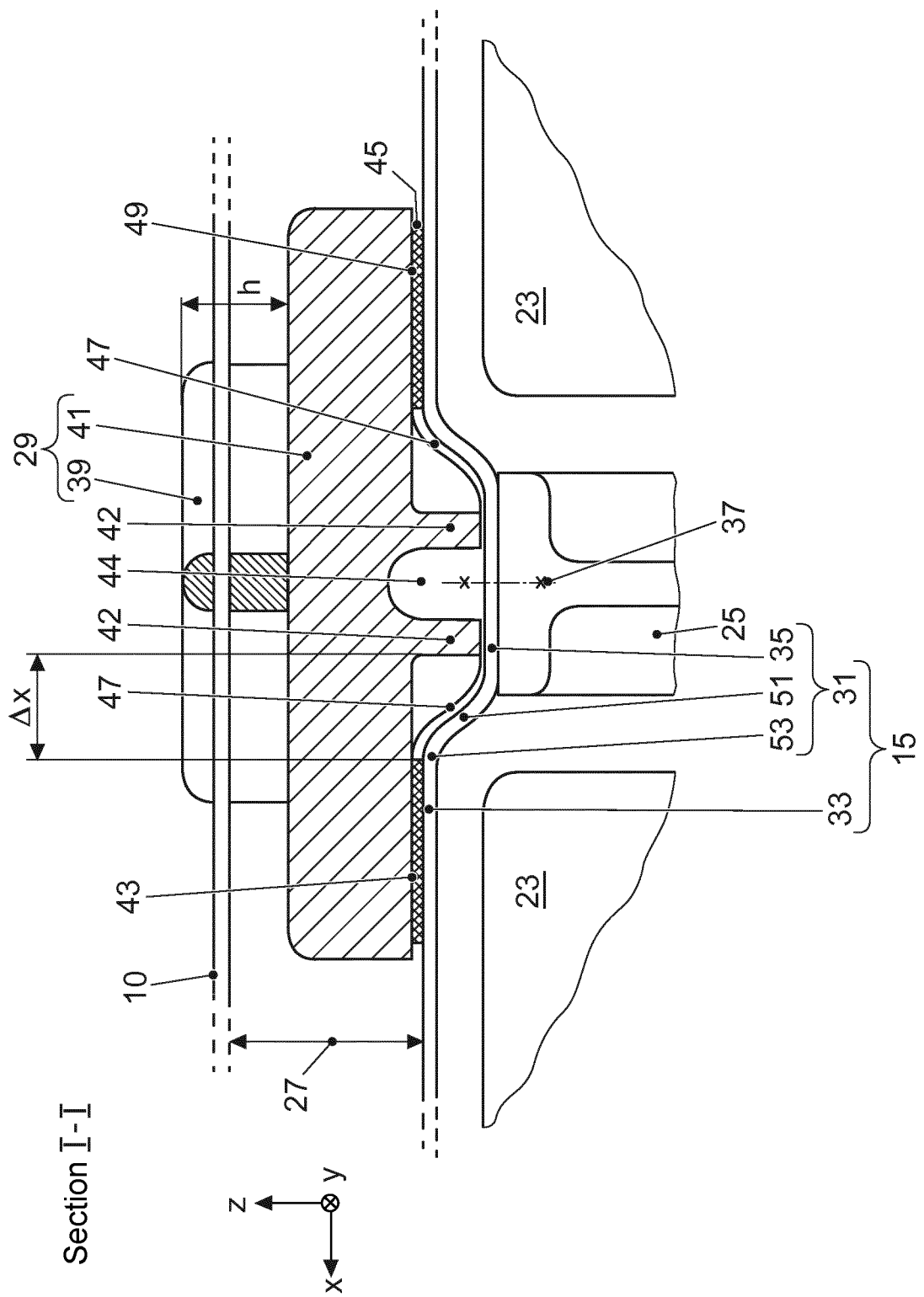

As is apparent from FIG. 3, a number of stiffening beads 31 can be formed in the battery top wall 15, only one of which is shown in FIG. 3 or 4. The stiffening bead 31 has a bead base 35 which is set back by a bead height from a top wall base portion 33 towards the battery interior. The bead base 35 is in force-transmitting contact with the battery cross-member 25 at a screw position 37. As is further apparent from FIG. 3 or 4, the spacers 29 are supported directly in the stiffening bead 31 on the bead base 35 thereof. As a result—when the floor sheet-metal part 10 is loaded—a vertical load path from the floor sheet-metal part 10 via the spacer 29 and the battery top wall 15 into the stiffening structure inside the battery (that is to say the battery cross-member 25) is provided. The battery cross-member 25 is therefore included in a transverse load path (in the event of a side crash) and/or in a vertical load path, depending on the loading case.

The geometry of the spacer 29 will be described hereinbelow: Accordingly, the spacer 29 is formed in two parts from a buffer 39 and a base 41. The buffer 39 is produced from an elastically resilient plastics soft component, while the base 41 is formed of a plastics hard component which is a rigid component in comparison. An important aspect of the invention consists in that, in the installed position, the spacer 29 is supported between the floor sheet-metal part 10 and the battery top wall 15 with elastic deformation of the buffer 39. For this purpose, the overall height h (FIG. 4) of the spacer 39 in the undeformed production state is greater than the size of the installation gap 27, as is indicated in FIG. 4. In FIG. 4, the spacer 29—contrary to the actual installed position—is shown in the undeformed production state.

The spacer base 41 has on its bottom side a supporting contour of two supporting ribs 42 which are spaced apart from one another and are supported in loose contact on the bead base 35. Between the two supporting ribs 42 there is defined an open passage 44, which will be described hereinbelow.

As is further apparent from FIG. 3, the base supporting contour (supporting ribs 42) merges in the vehicle longitudinal direction x (that is to say transversely to the bead longitudinal direction) on both sides, to the front and to the rear, with the interposition of a positioning flank 47, into a front base adhesive surface 43 and a rear base adhesive surface 49, which are adhesively bonded to the planar top wall base portion 33 with the interposition of an adhesive layer 45. The adhesive connection is therefore outside the stiffening bead 31 and offset with respect to the supporting contour 42 by an amount of offset Δx (FIG. 4). The two positioning flanks 47 of the spacer base 41 are in positive, loose contact with the respective bead walls 51 of the stiffening bead 31, which merge at transition edges 53 into the planar top wall base portion 33.

The screw position 37, which is only adumbrated in FIGS. 2, 3 and 4, has a fastening screw, not shown, the screw head 57 (FIG. 2 or 3) of which is positioned, in a manner that is advantageous in terms of installation space, inside the stiffening bead 31. The stiffening bead 31 extends in the vehicle transverse direction y as far as the lateral edge of the battery cover wall 15 that is outside the vehicle, and is open to outside the vehicle in the vehicle transverse direction y. In this manner, water or dirt which collects in the stiffening bead 31 in driving operation can be discharged to outside the vehicle in the vehicle transverse direction y in a discharge direction A (FIG. 3), namely through the open passage 44 of the spacer 29.

LIST OF REFERENCE NUMERALS 1 sill
3 A-pillar
5 C-pillar
7 side door openings
9 traction battery
10 floor sheet-metal part
11 battery housing
12 installation space
13 housing side wall
15 battery top wall
16 housing side wall
17 battery bottom wall
19 housing flange
21 screw connection
23 battery cells
25 battery cross-member
27 installation gap
29 spacer
31 stiffening bead
33 top wall base portion
35 bead base
37 screw position
39 buffer
41 base
42 supporting ribs
43 front adhesive surface
44 passage
45 adhesive layer
47 positioning flanks
49 rear adhesive surface
51 bead side wall
53 transition edge
55 fastening screw
57 screw head
Δx amount of offset
A discharge direction
E vehicle median longitudinal plane
h overall height of the spacer 29

The invention claimed is:

1. A body structure for an electrically operated vehicle, the body structure comprising:
a structure defining an installation space for a traction battery, said installation space being downwardly open in a vertical direction of the vehicle and being upwardly delimited by a floor sheet-metal part forming a vehicle floor;
a traction battery inserted into said installation space from underneath the vehicle, forming a free installation gap between a battery top wall of said battery and said floor sheet-metal part; and
at least one spacer disposed between said battery top wall and said floor sheet-metal part, said spacer being formed of at least two components, being a buffer and a base, said buffer being an elastically resilient soft component and said base being a rigid hard component relative to one another, and wherein, in an undeformed production state, an overall height of said spacer is greater than a size of said installation gap and, in an installed position, said spacer is supported between said floor sheet-metal part and said battery top wall and said buffer is elastically deformed; and
at least one stiffening bead being formed in said battery top wall, said stiffening bead having a bead base which is set back by a bead height from a top wall base portion towards a battery interior, and said bead base being in force-transmitting contact with a stiffening structure inside said battery, and, in order to provide a vertical load path from said floor sheet-metal part via said spacer, said battery top wall, and into said stiffening structure inside said battery, a spacer base being formed with a supporting contour configured for supporting said spacer on said bead base.

2. The body structure according to claim 1, wherein said spacer is fixedly attached to said battery top wall via an adhesive connection, with an adhesive surface of said base being adhesively bonded to said battery top wall via an adhesive layer.

3. The body structure according to claim 1, wherein said supporting contour of said spacer is supported in contact on said bead base of said stiffening bead, and a base adhesive surface is offset with respect to a base supporting contour, and/or said base adhesive surface is supported laterally outside said stiffening bead on said top wall base portion.

4. The body structure according to claim 3, wherein said supporting contour of said spacer is supported on said bead base of said stiffening bead without an adhesive or screw connection.

5. The body structure according to claim 1, wherein, to enable water or dirt collected in said stiffening bead to be discharged to outside the vehicle in the vehicle transverse direction in a discharge direction,
said stiffening bead is pressed into said top wall base portion from above relative to the vehicle;
said stiffening bead extends in a vehicle transverse direction as far as a lateral edge of said battery top wall; and/or
said stiffening bead is open to outside the vehicle in the vehicle transverse direction.

6. The body structure according to claim 5, wherein a base supporting contour is supported on said bead base while forming a passage that is open in the discharge direction.

7. The body structure according to claim 6, wherein said base supporting contour is formed with two supporting ribs which are supported on said bead base and between which an open passage is formed.

8. The body structure according to claim 1, wherein said stiffening bead is channel-shaped in a profile cross section, with two bead walls rising from said bead base and merging at transition edges into a planar said top wall base portion.

9. The body structure according to claim 8, wherein, transversely to the bead longitudinal direction and on both sides thereof, a base supporting contour merges into said base adhesive surface with an interposition of a positioning contour.

10. The body structure according to claim 9, wherein said positioning contour is a positioning flank which is in positive contact with the respective said bead wall.

11. The body structure according to claim 1, wherein said spacer is formed of two-component injection molded plastic and/or said battery top wall is screwed to said stiffening structure inside said battery at a screw position on said bead base of said stiffening bead.

12. The body structure according to claim 11, wherein a screw head of a screw is positioned at said screw position inside said stiffening bead.

13. The body structure according to claim 11, wherein said screw position and an adhesive connection of said spacer to said battery top wall are functionally and/or spatially separate from one another.

14. The body structure according to claim 1, wherein said spacer is formed of plastic molded in a two-component injection molding process.

\* \* \* \* \*